(12) United States Patent
Abrosimov et al.

(10) Patent No.: US 6,741,095 B2
(45) Date of Patent: May 25, 2004

(54) DATA TRANSMISSION SYSTEM, CIRCUIT AND METHOD

(75) Inventors: Igor Anatolievich Abrosimov, St. Petersburg (RU); Vasily Grigorievich Atyunin, St. Petersburg (RU)

(73) Assignee: Aucid Corporation, Limited, Guernsey (VG)

( * ) Notice: Subject to any disclaimer, the term of this patent is extended or adjusted under 35 U.S.C. 154(b) by 49 days.

(21) Appl. No.: 10/151,186

(22) Filed: May 21, 2002

(65) Prior Publication Data

US 2002/0190746 A1 Dec. 19, 2002

Related U.S. Application Data

(60) Provisional application No. 60/293,052, filed on May 21, 2001.

(51) Int. Cl.[7] .............................................. H03K 17/16
(52) U.S. Cl. ............................ 326/30; 326/86; 326/90; 326/26; 326/27; 327/108; 710/100; 710/126
(58) Field of Search .............................. 326/30, 26, 27, 326/82, 86, 90; 327/108; 710/100, 126

(56) References Cited

U.S. PATENT DOCUMENTS

| | | | |
|---|---|---|---|
| 3,742,153 A | 6/1973 | Matsuda et al. | 179/81 A |
| 5,296,756 A | 3/1994 | Patel et al. | 307/443 |
| 5,422,608 A | 6/1995 | Levesque | 333/17.3 |
| 5,559,441 A | 9/1996 | Desroches | 324/647 |
| 5,578,939 A | 11/1996 | Beers et al. | 326/30 |
| 6,118,310 A | 9/2000 | Esch, Jr. | 327/108 |
| 6,265,893 B1 * | 7/2001 | Bates | 326/30 |
| 6,275,066 B1 * | 8/2001 | Park et al. | 327/108 |
| 6,420,899 B1 | 7/2002 | Crittenden et al. | 326/30 |
| 6,424,175 B1 * | 7/2002 | Vangal et al. | 326/82 |
| 6,452,428 B1 * | 9/2002 | Mooney et al. | 327/108 |

FOREIGN PATENT DOCUMENTS

| | | | | |
|---|---|---|---|---|
| EP | 0463316 | 1/1992 | | H04L/12/40 |
| WO | WO 96 36114 | 11/1996 | | H03K/25/02 |

* cited by examiner

*Primary Examiner*—Vibol Tan
(74) *Attorney, Agent, or Firm*—Sughrue Mion, PLLC

(57) ABSTRACT

A transmission system and method for transmission of digital data with impedance matching at the terminal ends reduces reflected signals due to impedance mismatch at the terminating ends and due to impedance transition areas in the transmission line. The transmission system includes a transmission line having a driver end connected to a driving circuit and a receiving end connected to a receiving circuit, each said end having an adjustable termination means connected thereto On the driver end of the transmission line said adjustable termination means is incorporated in the driving circuit, while on the receiver end of the transmission line said adjustable termination means is connected in parallel with the receiving circuit. Thus, both the reflections produced on the ends of a transmission line and the reflections resulting from discontinuities within a transmission line will be terminated.

18 Claims, 5 Drawing Sheets

DATA TRANSMISSION SYSTEM, CIRCUIT AND METHOD

This application claims benefit to Provisional Application No. 60/293,052 filed May 21, 2001, the disclosure of which is incorporated herein by reference.

FIELD OF THE INVENTION

The present invention relates generally to the transmission of digital data. More particularly, the invention relates to a high-speed data transmission between ICs (integrated circuits).

BACKGROUND OF THE INVENTION

Over past years, the operating speed of computer processors has increased dramatically, resulting in additional demands on speeds of transmission of digital data. This has lead to very high frequencies in data transmission lines. At high frequencies some effects occur which are not observed at low frequencies in connection with the behavior of passive circuit elements (wires, circuit boards and integrated-circuit packages that make up a digital product). That is, at high frequencies passive circuit elements directly affect electrical performance.

One high frequency effect of particular concern in the present invention is that of signal reflection, which occurs when the impedance of a transmission line does not match the impedance of a terminating load on the driving end or receiving end of the line. Ideally, a terminating load will sink a transmitted signal immediately upon the signal arriving at the load. However, the terminating load often does not match the transmission line impedance because of variations in output resistance, which can result from the production variations of elements and/or temperature. In this case the load will sink only a portion of the signal upon the signal's initial arrival. The remaining portion of the signal will be reflected back onto the transmission line. If the driving circuit provides a terminating load that matches the impedance of the transmission line, the reflected signal portion will sink on reaching the driving end. Otherwise, the reflected signal portion will be partially reflected again and thus return to the receiving end. Thus, substantial reflected signal portions can go back and forth until they damp in the transmission line. Every time the reflected signal portion comes to the receiving end, it affects the main signal by producing an additional skew. This reduces the precision with which the signal can be measured, and therefore does not allow increasing the speed of data transmission.

It shall be noted that, within the above discussion, a uniform transmission line was considered, that is, a transmission line having impedance which can change in time, not lengthwise. However, a transmission line is generally not uniform. It can include unequal-impedance parts such as conductive traces on different boards or in different layers of the same board, connectors, and/or cables. An interface between these parts will also produce reflections, which will propagate both to the driving and receiving ends of the transmission line and contribute in affecting the signal.

Efforts were made to eliminate, or at least greatly reduce, signal reflections by matching, insofar as possible, the impedance of a terminating load and that of a transmission line.

Known are various impedance-matching means disclosed in U.S. Pat. Nos. 4,719,369; 5,134,311; 5,162,672; 5,811,197; 5,602,494; 6,191,663; 6,175,250; 6,157,215; 6,130,563; 6,127,862; 6,118,310; 6,087,853; 6,060,907; 5,955,894 and 5,578,939.

Generally, these patents disclose IC output drivers comprising a circuit which compensates for the variations in output resistance.

Specifically, a typical digitally controlled output driver disclosed in U.S. Pat. No. 6,118,310 has a pull-up and pull-down predriver circuits driven by an impedance control circuit. In operation, the driver impedance is pulled up or down as needed to match with the impedance of a transmission line. With the driver according to U.S. Pat. No. 6,118,310, a portion of the signal reflected on the receiving end back onto the transmission line will sink on its driving end and thus will not affect the received signal. However, the driver according to U.S. Pat. No. 6,118,310 will not help in sinking the above-mentioned reflections produced at the interfaces between the unequal-impedance parts. These reflections will go back and forth between the interface and the receiving end of the line, thus not reaching the driver end where they can be terminated.

In U.S. Pat. No. 5,578,939 a bi-directional transmission line driver/receiver for transmitting multi-valued logic signals is disclosed. The idea of the patent is to set interaction between the driver and the receiver by exchanging reference signals setting the magnitude of the signal to be transmitted and a bias of the terminator provided at the receiver end of the line. These reference signals are transferred via an additional transmission line referred to as "reference line". The additional line and interaction means make it a relatively complex system which will not, however, sink reflections produced at the interfaces between the unequal-impedance parts and directed backwards to the driving end of the transmission line. Reflected again at the driving end, these reflections will come to the receiving end and affect the signal.

The object of the invention is to provide a relatively simple transmission system and method which will effectively eliminate both the reflections produced on the ends of a transmission line and the reflections resulting from discontinuities within the transmission line, and will thus allow increasing the speed of data transmission.

SUMMARY OF THE INVENTION

In one aspect of the invention, claimed is a transmission system for transmission of digital data, the transmission system including a transmission line having a driver end connected to a driving circuit and a receiving end connected to a receiving circuit, each said end having an adjustable termination means connected thereto, wherein on the driver end of the transmission line said adjustable termination means is incorporated in the driving circuit, while on the receiver end of the transmission line said adjustable termination means is connected in parallel with the receiving circuit. Thus, both the reflections produced on the ends of a transmission line and the reflections resulting from discontinuities within a transmission line will be terminated.

The adjustable termination means can include a test line having substantially the same impedance as at least a portion of the transmission line. The test line can be constituted by the transmission line.

The driving circuit preferably comprises a buffering circuit connected to the driver end's adjustable termination means which in turn includes an impedance adjusting circuit and an associated control circuit.

The test line can be incorporated in the control circuit. Preferably, connected to the test line, is a test circuit including a buffering circuit and impedance adjusting circuit of substantially the same structure as the buffering circuit and impedance adjusting circuit incorporated in the driving circuit.

The test circuit can be constituted by a driving circuit of the transmission line.

The control circuit can further include a pulse generator, a counter, a comparator, and a flip-flop clocked by the pulse generator with a delay, the output of the pulse generator and the counter can be connected to the buffering circuit and impedance adjusting circuit, respectively, the test line and a source of a reference voltage can be connected to the input of the comparator, the output of the comparator can be connected to the flip-flop, and output of the counter can also be connected to the impedance adjusting circuit of the driving circuit.

Preferably, the receiver end termination means is constituted by a termination circuit which has substantially the same structure as said driving circuit. This allows fabrication of the data transmission circuit in a modular structure to reduce its cost.

In another aspect of the invention, claimed is a method of data transmission through a transmission line, the method including the following steps:

feeding, via a test circuit, a test pulse to a test line having the same impedance as at least the portion of the transmission line;

comparing the test pulse with a reference signal of half the voltage of the driver swing;

adjusting the test circuit impedance to the value at which the test pulse substantially equals the voltage of the reference signal;

setting the impedance of the driver of the transmission line to the said value.

The test pulse can be fed to the transmission line used as the test line. Thus, no separate test line is needed. In this embodiment data transmission shall be interrupted to feed the test pulse to the transmission line.

An exemplary embodiment of the invention is further described, by means of example, in detail with reference to the attached drawings.

DETAILED DESCRIPTION OF A PREFERRED EMBODIMENT

Figure 1:
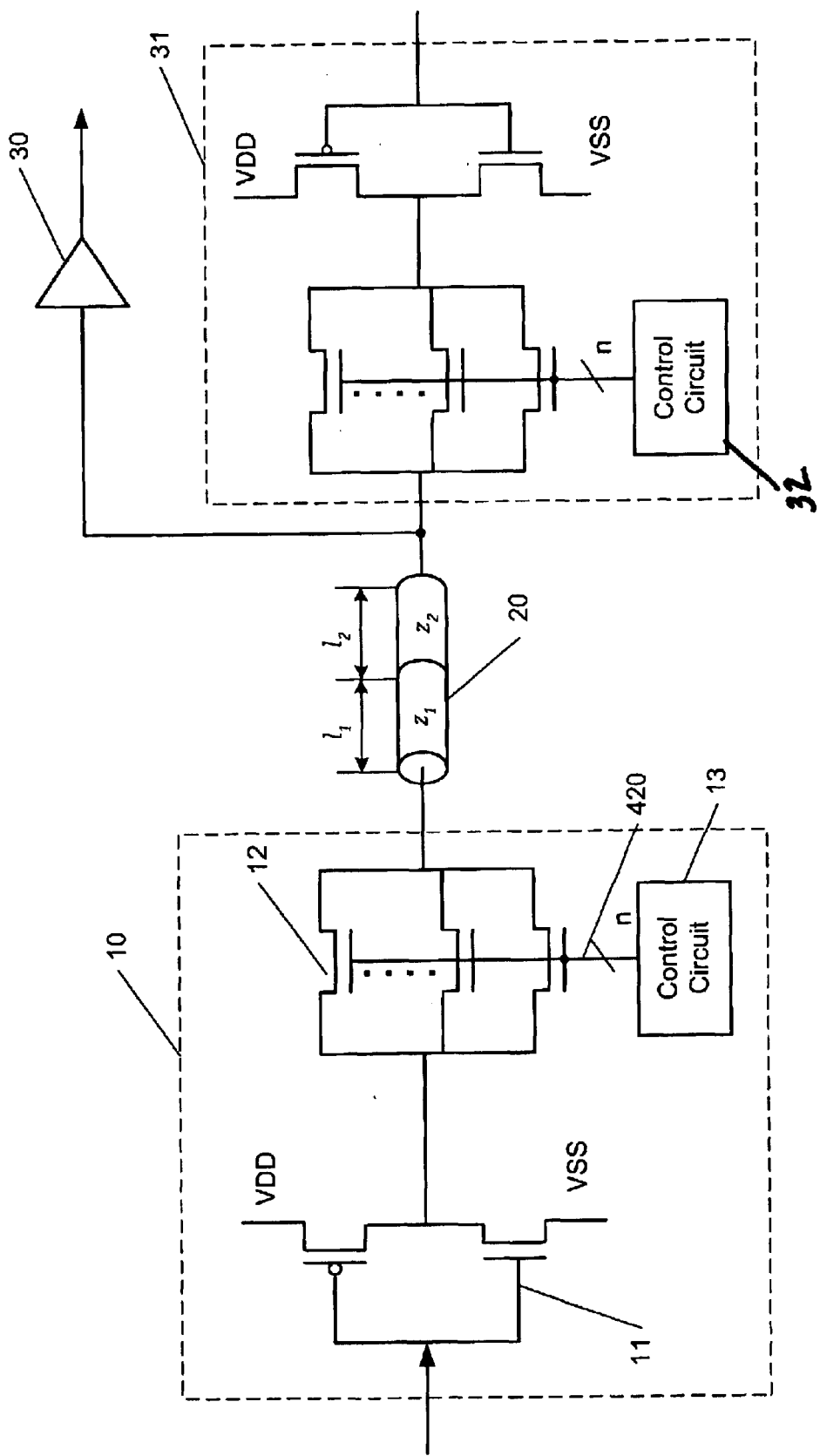
FIG. 1 shows a diagram of the data transmission system according to an exemplary embodiment of the invention.

The diagram of FIG. 1 shows a driving circuit or driver 10, the output of which is connected with a transmission line 20 electrically connecting the driver 10 and a receiving circuit 30. At the input of the driver 10 a logical signal is fed from the inner circuits of a chip (not shown). In this example, the transmission line 20 has a first portion having a length $l_1$ and impedance $z_1$ and a second portion having a length $l_2$ and impedance $z_2$.

As shown in the diagram of FIG. 1, the driver 10 consists of a buffering circuit 11 and an adjustable termination means which may comprise an impedance adjusting circuit 12 and an associated control circuit 13. The control circuit is presented in more detail in FIG. 2. The impedance adjusting circuit 12 includes a plurality of FETs (field-effect transistors) connected in parallel and thus forming an adjustable resistor, the impedance of which can be adjusted by turning the FETs on and off. The more FETs are on, the smaller the impedance is.

Figure 2:
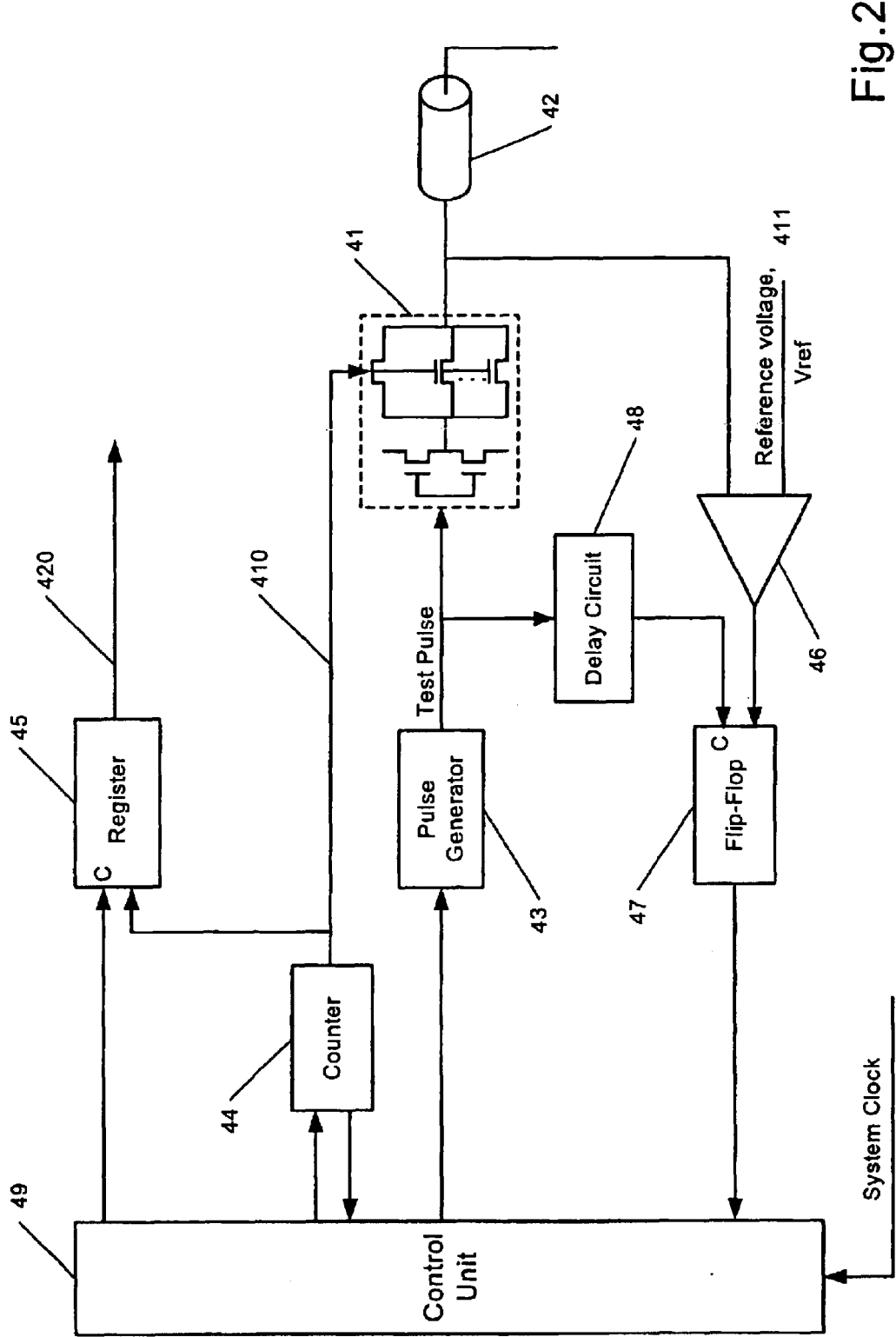
FIG. 2 shows a block diagram of the control circuit incorporated in the data transmission system of FIG. 1.

The diagram of FIG. 2 shows the control circuit 13 in detail. The control circuit 13 includes a test driver or test circuit 41 which, like the driver 10, includes a buffering circuit and an impedance adjusting circuit identical to the corresponding circuits 11 and 12 of the driver 10 and therefore not presented in detail. The output of the test driver 41 is connected with a test line 42 which has the same impedance as the first portion of the transmission line 20. Preferably, the test line 42 is open-circuit. However, it can be shorted. It shall be noted that the test line 42 is not used for data transmission, only for impedance adjusting. Further, the adjustable termination means includes a pulse generator 43, a counter 44, a register 45, a comparator 46, a flip-flop 47, a delay circuit 48 and a control unit 49.

The output of the pulse generator 43 is connected to the test driver 41, namely to its buffering circuit, and, through the delay circuit 48, to the flip-flop 47. Thus, the flip-flop 47 is clocked by the pulse generator 43 with a delay which is provided by the delay circuit 48 and which is preferably one half of the test line round trip. Also connected to the test driver 41, namely to its impedance adjusting circuit, is an impedance control bus 410 running from the output of the counter 44. On the other hand, the output of the counter 44 is connected, through the register 45 and via the impedance-adjusting bus 420, to the impedance adjusting circuit 12 of the driver 10. Each line in each bus 410 and 420 controls one FET of the impedance adjusting circuit of the corresponding driver 10 and 41. The test line 42 is connected to the input of the comparator 46. Also, a source 411 of a reference voltage is connected to the input of the comparator 46. The output of the comparator 46 is connected to the flip-flop 47. The control unit 49 is connected with the inputs of the register 45, pulse generator 43, and counter 44, and with the outputs of the flip-flop 47 and counter 44.

Figure 3:
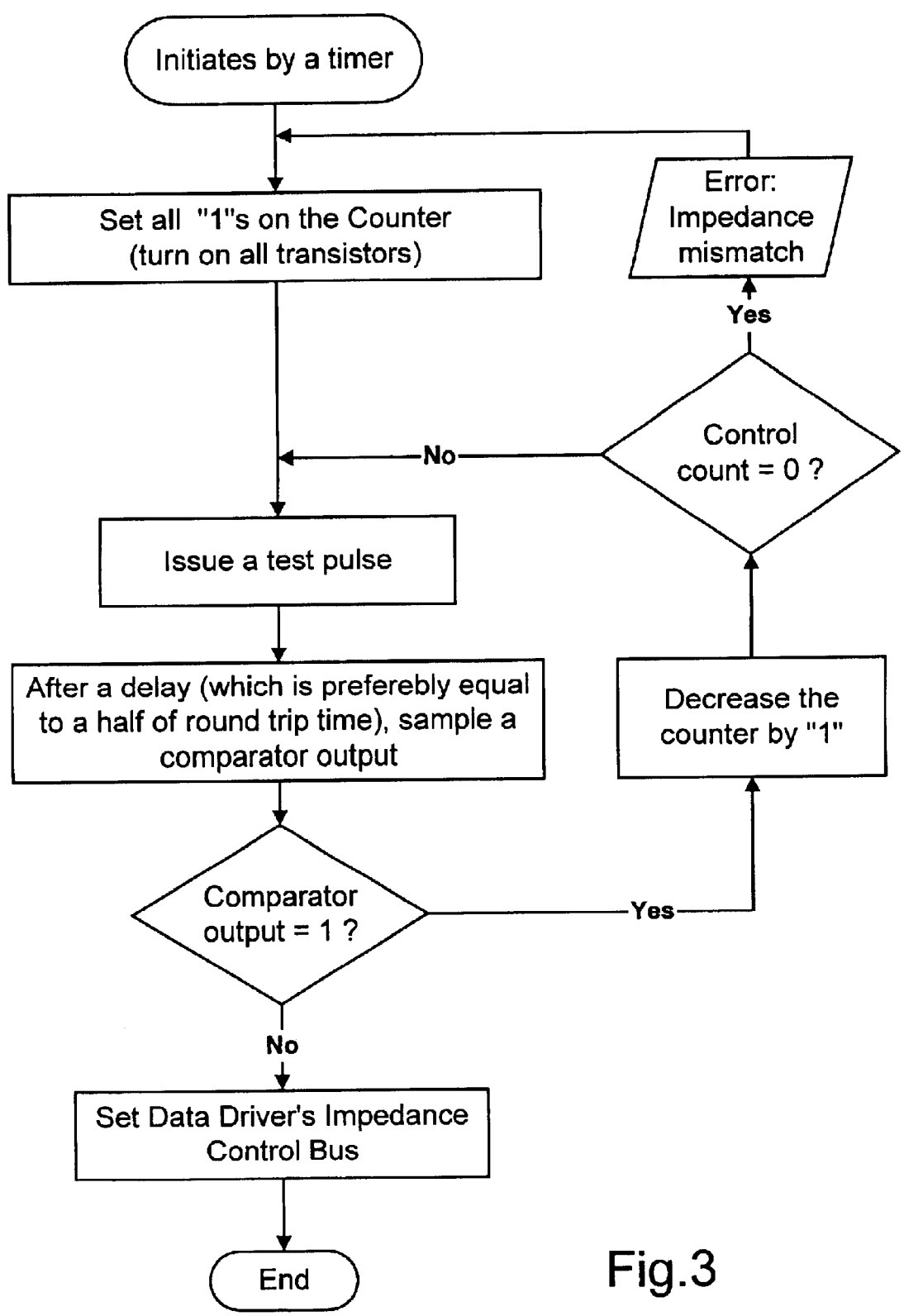
FIG. 3 shows a flowchart illustrating the process of impedance matching.

The operation of the impedance adjusting circuit is illustrated by the flowchart of FIG. 3. The adjusting process is initiated at a desired time, when an impedance mismatch due, e.g., to the temperature changes, is expected to occur. In an exemplary embodiment, a timer can be used to set this time. On initiation of the system, the control unit 49 sets all "1"s at the counter 44 to turn on all the FETs of the driver's impedance-adjusting circuit 12 and thus set the driver impedance at one end of its extreme value. Then the pulse generator 43 issues a test pulse which passes through the test driver 41. At the output of the test driver 41 the test pulse is sampled and fed to the comparator to be compared with a reference signal of half the voltage of the driver swing. It is well known to those skilled in the art that the voltage of the sampled pulse is a function of the voltage of the driver swing, the impedance of the line and the impedance of the driver. This function is as follows:

$$V_{sampled}=V_{driver}(Z_{line}/(Z_{driver}+Z_{line})),$$

where $V_{sampled}$ is the amplitude of the sampled pulse;

$V_{driver}$ is the amplitude at the output of the buffering circuit (driver swing);

$Z_{line}$ is the impedance of the line; and $Z_{driver}$ is the impedance of the driver.

Therefore, if the voltage of the sampled pulse equals the voltage of the reference signal that is half the voltage of the driver swing, i.e.

$$V_{sampled} = V_{ref} = V_{driver}/2,$$

the impedance of the driver will match the impedance of the line (or a portion of the line):

$$Z_{driver} = Z_{line}.$$

To achieve this, the impedance of the driver is adjusted step by step, decreasing (by command of the control unit 49) the set of the counter 44 until the output of the comparator 46 changes to "0". This will mean that the sampled pulse substantially equals the voltage of the reference signal (the allowance is proportional to the magnitude of one adjustment step, and therefore inversely proportional to the number of FETs in the impedance adjusting circuit 12). The flip-flop 47 is clocked with a delayed test pulse to sample the state of the comparator at the center of the pulse platform (see FIG. 4). Though the embodiment of a down counter is used, one skilled in the art would understand that an up counter may also be applied to adjust the impedance in the opposite direction.

Figure 4A:
FIG. 4 schematically shows signal waveforms illustrating the process of impedance matching.
Figure 4B:
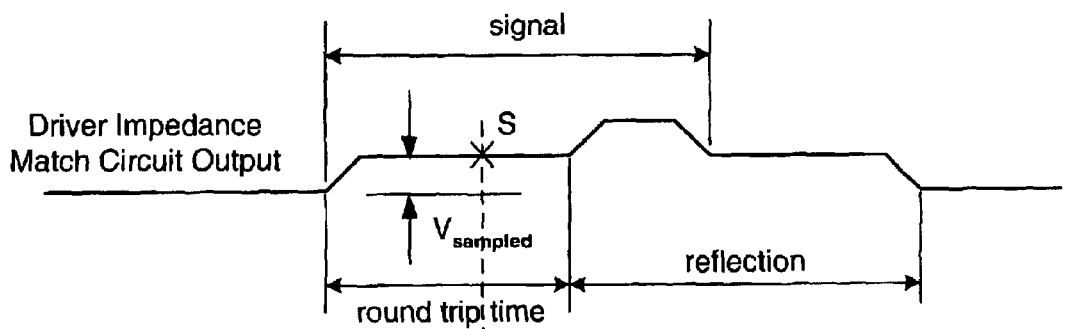
Figure 4C:
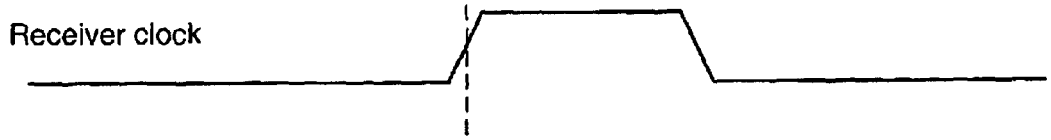

This process is illustrated in FIG. 4 schematically showing signal waveforms. Curve a) represents the output of the driver's buffering circuit. Curve b) represents the output of the driver's impedance adjusting circuit, i.e. the same signal driven to the transmission line and affected by reflection. It is seen that the signal magnitude is reduced. This reduction is in correspondence with the difference between the line impedance and the driver impedance. The signal magnitude reaches its full swing at the cental portion of the curve where the signal and reflection overlap. Finally, curve c) illustrates the clock. Due to its delay, the signal of curve b) is sampled at a point marked with "s".

As mentioned earlier, the fact that the voltage of the sampled pulse equals the voltage of the reference signal means that the impedance of the driver matches the impedance of the test line 42 first portion. When the impedance is thus matched, the corresponding counter set is transferred to the register 45 to be stored therein and, further, to the driver 10. Thus, at the driver 10 the same impedance is set as the impedance of the test driver 41. Since the transmission line 20 is identical to the test line 42, and the driver 10 is identical to the test driver 41, impedance matching between the driver 10 and the first portion of the transmission line 20 is thus achieved.

As seen from FIG. 1, the adjustable termination means of the receiver 30 are connected in parallel and constituted by a termination circuit 31 identical to the driving circuit 10. Control circuit 32 of the termination circuit 31 has the same structure as the control circuit of the driving circuit 10, except that the output of the test driver is connected with another test line which has the same impedance as the second portion of the transmission line 20. As an alternative, a single line can be used as a test line for both control circuits, 13 and 32. This test line can be similar to the transmission line 20, i.e., can have a first portion having an impedance of approximately $z_1$ and a second portion having an impedance of approximately $z_2$. Than, the control circuits 13 and 32 will be connected to the first portion and the second portion, respectively, of the test line.

Control circuit 32 operates in the same manner as the control circuit of the driving circuit 10 to match the impedance of the termination circuit 31 with the impedance of the second portion of the transmission line 20 and thus, is not further disclosed.

Figure 5:
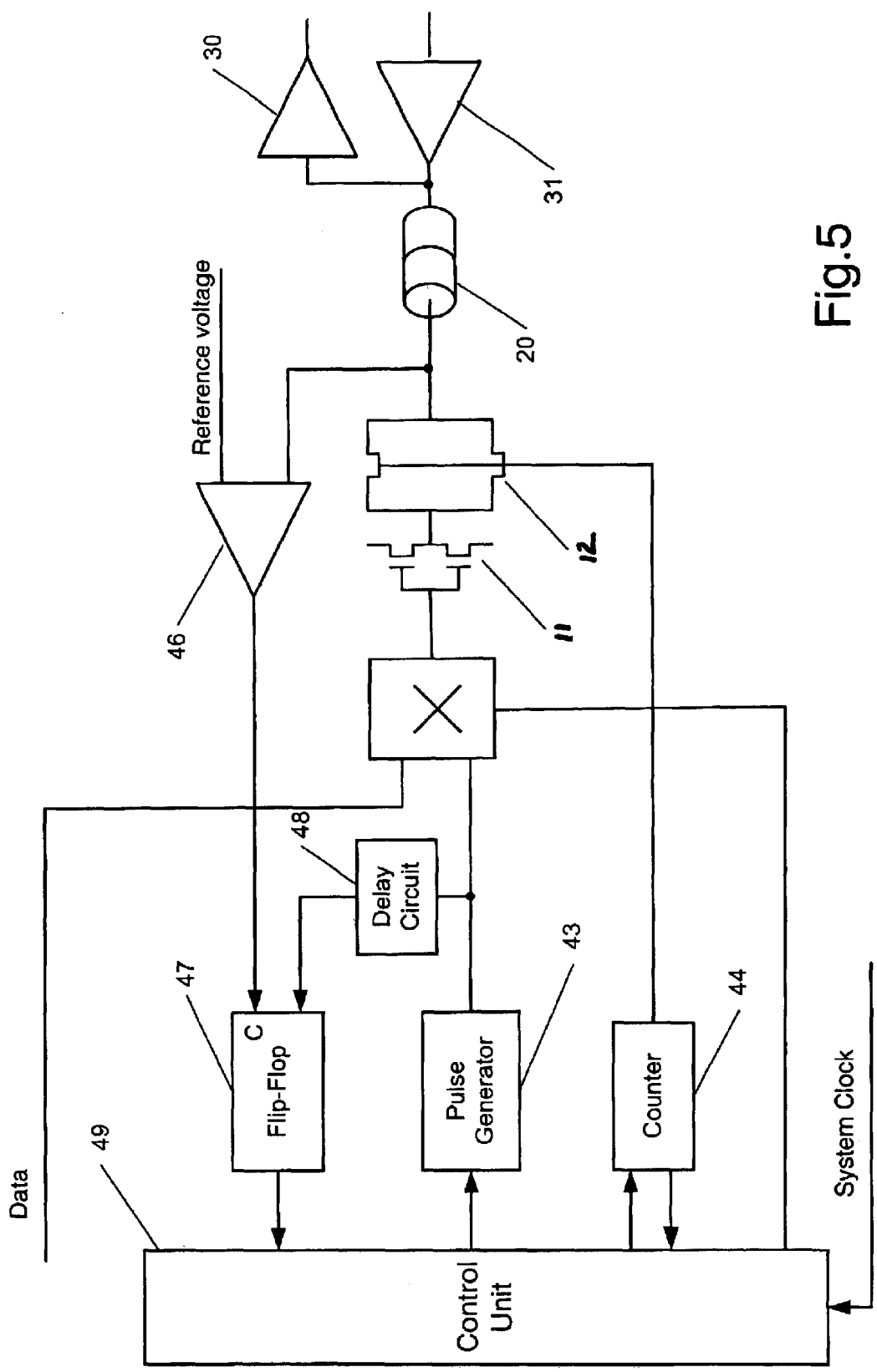
FIG. 5 shows a diagram illustrating an embodiment in which the transmission line is used for impedance adjusting.

It shall be noted that the transmission line 20 itself can be used for impedance adjusting. In this embodiment presented in FIG. 5 data transmission shall be interrupted, and the test pulse fed to the transmission line 20. It can be seen, that in this embodiment no register is used because there is no need to store the impedance-matching setting of the counter to apply it to another line.

While there have been described herein the principles of the invention, it is to be clearly understood to those skilled in the art that this description is made only by way of example and not as a limitation to the scope of the invention.

Thus, impedance matching can be performed in a data transmission means comprising a plurality of transmission lines, using one control circuit connected to each of these lines.

It shall further be understood that another type of impedance adjusting circuit can be used. E.g., the impedance adjusting circuit can be incorporated in the buffer circuit or an analog adjusting means can be used.

What is claimed is:

1. Transmission system for transmission of digital data, the transmission system including a transmission line having a driver end connected to a driving circuit and a receiving end connected to a receiving circuit, said driving end having a first adjustable termination means connected thereto, and said receiving end having a second adjustable termination means connected thereto, wherein at least the first adjustable termination means include a test line having substantially the same impedance as at least a portion of the transmission line and wherein on the driver end of the transmission line said first adjustable termination means is incorporated in the driving circuit, while on the receiver end of the transmission line said second adjustable termination means is connected in parallel with the receiving circuit.

2. The transmission system as claimed in claim 1, wherein the test line is constituted by the transmission line.

3. The transmission system as claimed in claim 1, wherein the driving circuit comprises a buffering circuit connected to the driver end's first adjustable termination means, said first adjustable termination means comprises an impedance adjusting circuit and an associated control circuit.

4. The transmission system as claimed in claim 3, wherein a test line is incorporated in the control circuit and, connected to the test line, is a test circuit including a test buffering circuit and a test impedance adjusting circuit of substantially the same structure as the buffering circuit and the impedance adjusting circuit incorporated in the driving circuit.

5. The transmission system as claimed in claim 4, wherein the control circuit further includes a pulse generator, a counter, a comparator, and a flip-flop clocked by the pulse generator with a delay, the output of the pulse generator and the counter is connected to the test buffering circuit and test impedance adjusting circuit, the test line and a source of a reference voltage is connected to the input of the comparator, the output of the comparator is connected to the flip-flop, and output of the counter is also connected to the impedance adjusting circuit of the driving circuit.

6. The transmission system as claimed in claim 4, wherein the test circuit is constituted by a driving circuit of the transmission line.

7. The transmission system as claimed in claim 1, wherein the receiver end termination means is constituted by a termination circuit which has substantially the same structure as said driving circuit.

8. The transmission system of claim 1, wherein the transmission line comprises a first portion and a second portion having different impedance values, and wherein the first adjustable termination means sets a first matching impedance value based on the impedance value of the first portion of the transmission line, and the second adjustable termination means sets a second matching impedance value based on the impedance value of the second portion of the transmission line.

9. The transmission system of claim 8, wherein the first adjustable termination means comprises a test pulse generator, a down counter, a plurality of resistive elements connected in parallel, and a comparator, wherein the test pulse generator applies a test pulse to the plurality of resistive elements to provide a first voltage result, and wherein the comparator compares the first voltage result to a first reference voltage, and based on the output of the comparator, the down counter decreases one increment such that the pulse generator supplies a second test pulse to the plurality of resistive elements.

10. The transmission system of claim 1, wherein the first adjustable termination means comprises a test pulse generator, a down counter, a plurality of resistive elements connected in parallel, and a comparator, wherein the test pulse generator applies a test pulse to the plurality of resistive elements to provide a first voltage result, and wherein the comparator compares the first voltage result to a first reference voltage, and based on the output of the comparator, the down counter decreases one increment such that the pulse generator supplies a second test pulse to the plurality of resistive elements.

11. The transmission system according to claim 1, wherein the first adjustable termination means includes a control circuit.

12. The transmission system according to claim 11, wherein the control circuit includes a first buffering circuit and a first adjustable resistive element connected in series.

13. The transmission system according to claim 12, wherein the driving circuit includes a second buffering circuit and a second adjustable resistive element connected in series.

14. A method of data transmission through a transmission line, the method comprising:

feeding, via a test circuit, a test pulse to a test line having the same impedance as at least the portion of the transmission line;

comparing the test pulse with a reference signal of half the voltage of a driver swing, said driver supplying data to the transmission line;

adjusting the test circuit impedance to the value at which the test pulse substantially equals the voltage of the reference signal;

setting the impedance of the driver of the transmission line to the said value.

15. The method as claimed in claim 14, wherein the test pulse is fed to the transmission line used as the test line.

16. The method of claim 14, each of said steps are performed at a driving end and a receiving end of the transmission line.

17. A driving circuit for driving digital data to a transmission line, the driving circuit comprising an adjustable termination means including a test line having substantially the same impedance as at least a portion of the transmission line, the driving circuit further comprising a buffering circuit connected to the adjustable termination means which in turn includes an impedance adjusting circuit and an associated control circuit, the test line being incorporated in the control circuit, wherein, connected to the test line, is a test circuit including a test buffering circuit and test impedance adjusting circuit of substantially the same structure as the buffering circuit and the impedance adjusting circuit incorporated in the driving circuit.

18. The driving circuit as claimed in claim 17, wherein the control circuit further includes a pulse generator, a counter, a comparator, and a flip-flop clocked by the pulse generator with a delay, the output of the pulse generator and the counter is connected to the test buffering circuit and test impedance adjusting circuit, and wherein the test line and a source of a reference voltage is connected to the input of the comparator, the output of the comparator is connected to the flip-flop, and output of the counter is also connected to the impedance adjusting circuit of the driving circuit.

* * * * *

UNITED STATES PATENT AND TRADEMARK OFFICE
CERTIFICATE OF CORRECTION

PATENT NO. : 6,741,095 B2
DATED : May 25, 2004
INVENTOR(S) : Atyunin, Vasily Grigorievich and Abrosimov, Igor Anatolievich It is certified that error appears in the above-identified patent and that said Letters Patent is hereby corrected as shown below:

Title page,
Item [73], Assignee, should read as follows:
-- [73] Assignee: Acuid Corporation Guernsey Limited, Guernsey British Isles --

Signed and Sealed this

Thirtieth Day of November, 2004

JON W. DUDAS
*Director of the United States Patent and Trademark Office*